(12) United States Patent
Allen et al.

(10) Patent No.: US 6,622,764 B2
(45) Date of Patent: Sep. 23, 2003

(54) UNDERLAY STRUCTURE FOR INCREASED CROWN STIFFENING

(75) Inventors: Walter Dale Allen, Bertrange (LU); Laurent Colantonio, Bastogne (BE); Frank Philpott, Waldbredimus (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/062,391

(22) Filed: Feb. 1, 2002

(65) Prior Publication Data
US 2003/0145931 A1 Aug. 7, 2003

(51) Int. Cl.[7] .............. B60C 9/18; B60C 9/20; B60C 9/22

(52) U.S. Cl. .......... 152/531; 152/532; 152/533

(58) Field of Search .............. 152/531, 533, 152/532

(56) References Cited

U.S. PATENT DOCUMENTS

| 4,506,718 A | | 3/1985 | Abe et al. |
| 5,383,507 A | * | 1/1995 | Sato et al. .............. 152/531 X |
| 5,759,314 A | | 6/1998 | Southarewsky |
| 5,996,662 A | | 12/1999 | Cluzel |
| 6,082,426 A | | 7/2000 | Colom |
| 6,199,612 B1 | | 3/2001 | Costa Periera et al. |

* cited by examiner

Primary Examiner—Adrienne C. Johnstone
(74) Attorney, Agent, or Firm—Howard M. Cohn

(57) ABSTRACT

The present invention is a crown-stiffening underlay structure comprised of a flat strip of elastomeric material reinforced with essentially inextensible cords. The cord-reinforced flat strip is wrapped helically around the green tire carcass prior to blowup into the characteristic toroidal shape of a tire carcass. In one embodiment, the underlay structure is disposed between breakers and the radial ply structure. In another embodiment, the underlay is disposed between the radial ply structure and the innerliner. In another embodiment, the afore described underlay structure has an additional and structurally contiguous beam made of elastomeric material.

12 Claims, 8 Drawing Sheets

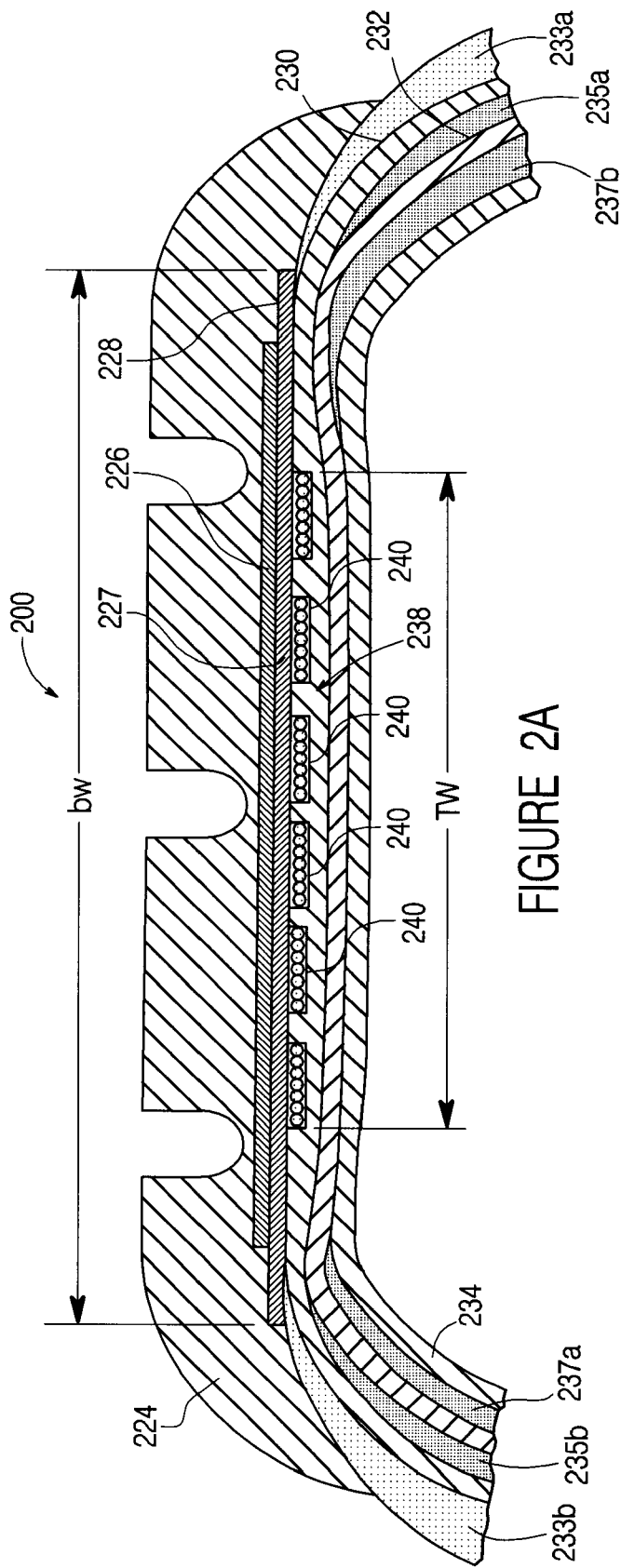
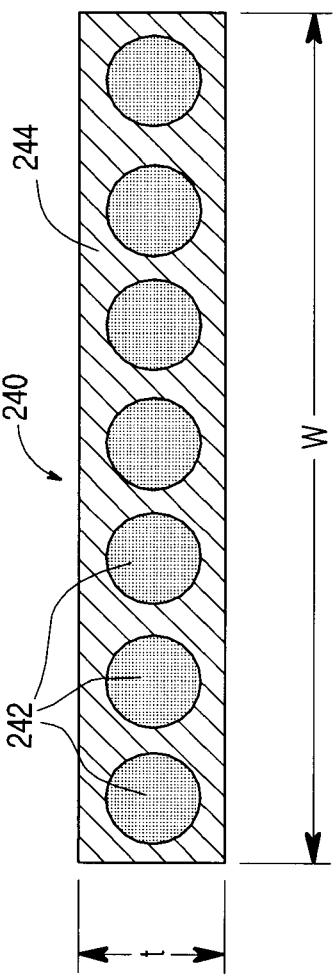
FIGURE 2A
FIGURE 2B

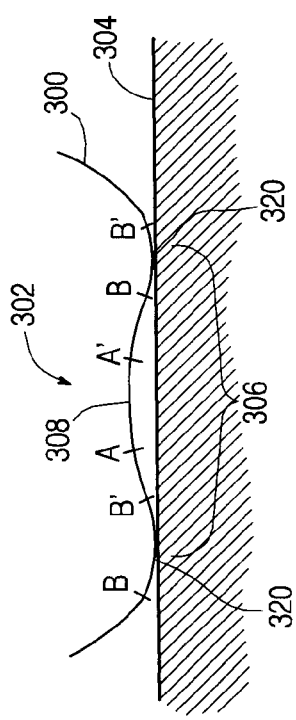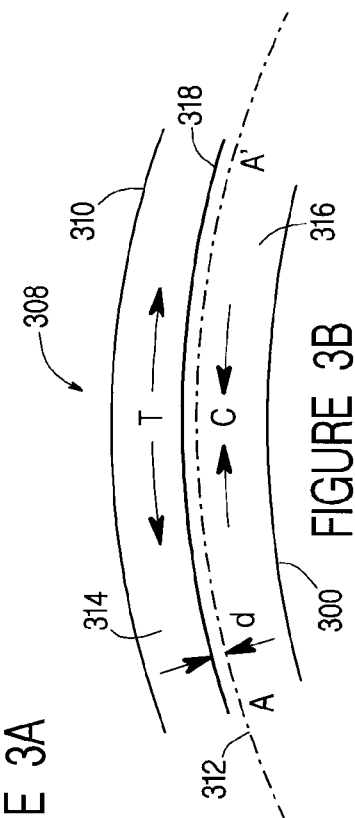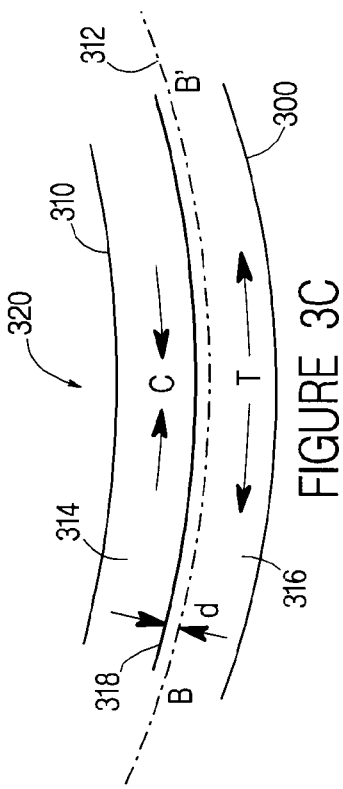

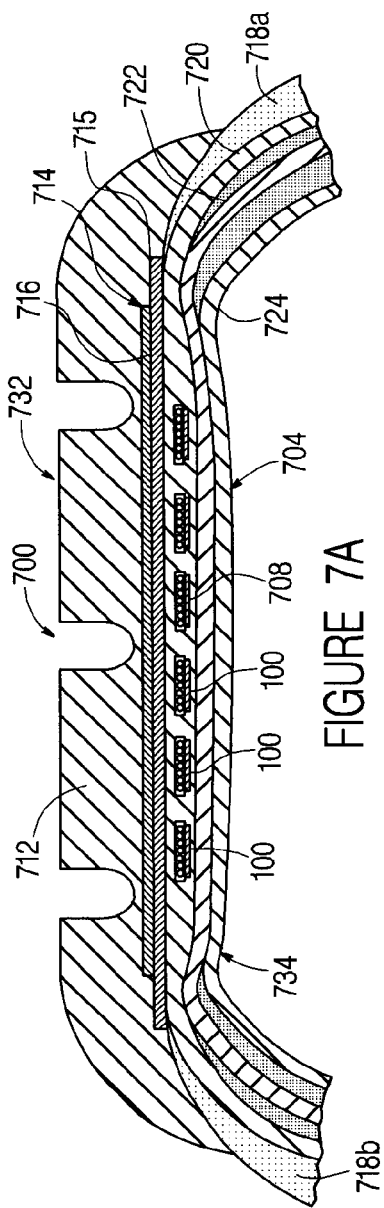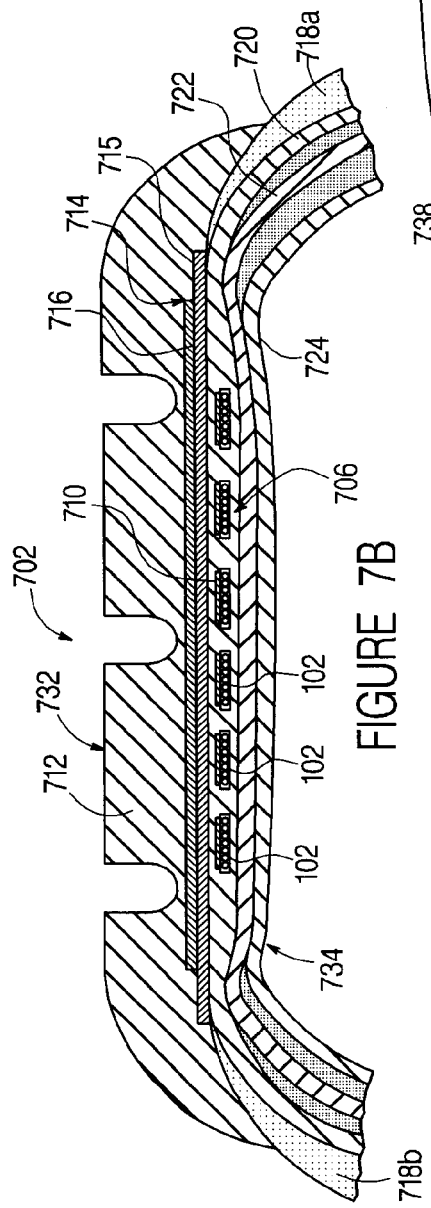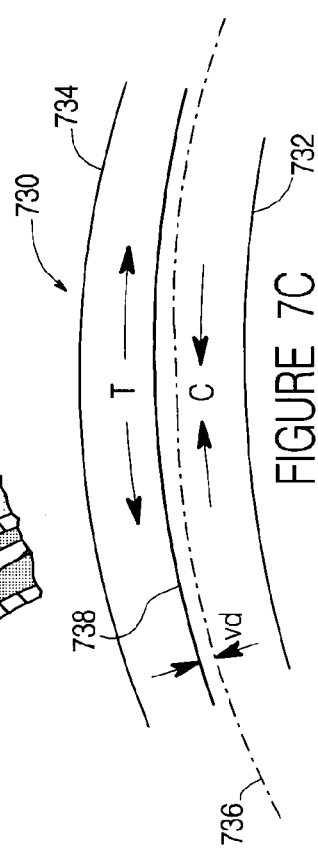

UNDERLAY STRUCTURE FOR INCREASED CROWN STIFFENING

TECHNICAL FIELD

The present invention relates to a pneumatic radial ply tire and to the problem of crown lift-off (upward buckling of the tread) when a tire is inflated, underinflated or in the case of runflat tires, uninflated. More specifically, the present invention relates to tread underlays that serve to stiffen the tread and improve handling behavior, in both non-runflat tires, as well as runflat tires during inflated, underinflated or uninflated operation.

BACKGROUND OF THE INVENTION

A typical driver can usually feel when the handling of an automobile or light truck deteriorates when one or more tires (non-runflat as well as runflat tires) is underpressurized or underinflated. During underpressurized operation, the area of contact between the road and the tire tread changes in undesirable ways. Most specifically, the central region of the ground-contacting portion of the tread tends to lift off of the ground, or to buckle upwards, thereby reducing the tread's area of contact with the ground, which affects vehicle handling.

An additional problem associated with underinflated operation is cyclical flexure of the region of the ground-contacting portion of the tire's crown and sidewalls which, especially during high speed operation, can lead to heating and to fatigue failure of the tire components and structure such that the result can be crown failure of the tire.

The problem of crown lift-off is especially relevant to the design of runflat tires, also known as Extended Mobility Tires (EMTs), which are designed to provide continued operation service when underinflated or even when uninflated.

It is believed that the problem of tread lift-off is also relevant to the design of non-EMTs which can also suffer handling problems when operating in an underinflated mode, especially during high-speed operation when the problem of flexure and flexure-induced heating is greatest.

Therefore the goals of tire design include various structural designs that minimize the upward buckling of the central portion of the ground-contacting portion of the tread so as to enhance vehicle handling in all circumstances including, when the tire is at normal operating pressure, if the tire loses part of its pneumatic pressure or, in the case of EMTs, if the tire looses all of its inflated pressure.

In general, the term "runflat," when applied to an EMT, means that the tire structure alone has sufficient strength to support the vehicle load when the tire is operated in the uninflated condition. That is, the sidewall and internal surfaces of the tire do not collapse or buckle onto themselves in the extreme manner associated with conventional tires that are uninflated. Current EMT design is directed toward providing rigid sidewalls and crown structures, rather than to the incorporation of internal supporting structures and devices to prevent the tire from collapsing. However, design consideration is also often given to the strengthening of the crown region.

Thus, among the goals of improving tire design, both of EMTs and non-EMTs, is that of stiffening the crown region against undesirable flexure during low-pressure or no-pressure operation. Among the ways to stiffen the crown is that of incorporating an underlay beneath the tread, radially inward of the belts and radially outward of the ply layers of the carcass.

For example, Cluzel, in U.S. Pat. No. 5,996,662, describes a "heavy vehicle" reinforcement "composed of at least two crossed working plies and at least one ply of circumferential cables arranged above the carcass ply."

Colom, U.S. Pat. No. 6,082,426 describes the incorporation of a "crown reinforcement having at least two working crown plies made of inextensible cables, crossed from one ply to the other and forming angles of between 10° and 45° with the circumferential direction" and "an additional, axially continuous, ply formed of metallic elements oriented substantially parallel to the circumferential direction . . . place radially between the working plies" and extending laterally to 1.05 times the width of the breaker(s).

Abe, et al., in U.S. Pat. No. 4,506,718, describe an off-road vehicle tire having an extra layer of reinforced crown material designed to resist penetration by sharp objects.

Costa Pereira, et al., in U.S. Pat. No. 6,199,612, describe a "single layer of cushion compound between the cords of the carcass reinforcement that are furthest radially outward in the crown and eh cords of the belting that are furthest radially inward in the crown," for the purpose of increasing crown rigidity without sacrificing losses to hysteresis; but no reinforcing cords are evident in this design of Pereira, et al.

Southarewsky, in U.S. Pat. No. 5,759,314, shows a crown reinforcement for a biased ply tire in which the reinforcement consists of "a member disposed between a first carcass and an additional carcass in the crown region of the tire for restricting the circumferential growth of the tire. The reinforcement member includes a plurality of cords oriented at zero degrees. The total circumferential strength of the reinforcement member is about 20% to 250% of the circumferential strength of the carcass plies."

A further goal is to minimize the weight of such crown reinforcements, especially given that, because they are disposed radially distant from the axis of rotation, add to the tire's rotational moment of inertia about its main axis of rotation, which detracts from vehicle acceleration due to both the excess weight and the increased moment of inertia, as well as heat build up due to flexure of the additional material. The ideal crown stiffening invention has minimal weight. In EMT tires, the sidewall reinforcements tend to convey undesirable bending stresses to the crown region during low-pressure and no-pressure operation, which is also to be resisted by the crown reinforcement so as to give improved tire life under less-than-optimal-pressure operation.

With respect to conventional non-EMT tires, it is believed that the benefits of a crown and tread region that is resistant to upward flexure or liftoff during underinflated operation is, of course, improved vehicle handling during the interval until the tire can be reinflated to full pressure or otherwise repaired and reinflated to full design pressure.

SUMMARY OF THE INVENTION

The present invention relates to a pneumatic radial ply tire having a tread, a carcass with two sidewalls, two inextensible annular beads, a radial ply structure, a belt structure located between the tread and the radial ply structure, and an air impermeable innerliner. In addition, a crown stiffening underlay structure is disposed radially inward of and adjacent the belt structure and radially outward of and adjacent the radial ply structure. The underlay structure is comprised of a single flat strip of material disposed in a plurality of spaced apart circumferential windings about the tire carcass. The flat strip is comprised of a plurality of high modulus, essentially inextensible cords embedded more or less parallel to one another within an elastomeric matrix. The high modulus, essentially inextensible cords are made of a material selected from a group of materials exemplified by nylon, rayon, polyester, aramid, metal and glass. The overall lateral width of the underlay structure is less than the lateral width of the breaker structure. The plurality of essentially inextensible cords embedded within the elastomeric matrix of the underlay structure may or may not be cut at regular intervals of between about 10 cm and 20 cm, to enable the underlay strip to increase in length to accommodate the increase in circumference as the green tire carcass is blown up into a toroidal carcass shape. The cords are cut if the blow up change in diameter of the underlay strip is greater than the limited extensibility of the cord.

In a second embodiment, the present invention relates to a pneumatic radial ply tire having a tread, a carcass with two sidewalls, two inextensible annular beads, a radial ply structure, a belt structure located between the tread and the radial ply structure, and an air impermeable innerliner. The tire has a crown stiffening underlay structure disposed radially inward of and adjacent the belt structure and radially outward of and adjacent the radial ply structure. The underlay structure is comprised of a single flat strip of material disposed in a plurality of spaced apart circumferential windings about the tire carcass. The flat strip is comprised of a plurality of high modulus, essentially inextensible cords embedded more or less parallel to one another within an elastomeric matrix and a beam made of elastomeric material that is contiguous with the elastomeric matrix in which the high modulus essentially inextensible cords are embedded. The high modulus, essentially inextensible cords are made of a material selected from a group of materials exemplified by nylon, rayon, polyester, aramid, glass and metal. The overall lateral width of the underlay structure is less than the lateral width of the breaker structure. The plurality of essentially inextensible cords embedded within the elastomeric material of the underlay structure may or may not be cut at regular intervals of between about 10 cm and 20 cm in order to enable the underlay strip to accommodate the blown up of the green tire carcass into the toroidal carcass shape. The cords are cut if the blow up change in diameter of the underlay strip is greater than the limited extensibility of the cord. The beam is made of elastomeric material having a modulus of elasticity that is equal to or greater than the modulus of elasticity of the elastomeric material within which the essentially inextensible cords are embedded. The beam has a thickness of between about 1 mm and 10 mm and most preferably a thickness of between about 3 mm and 7 mm. The beam portion of the underlay structure is positioned radially inward of the main body of the underlay structure or radially outward of the main body of the underlay structure.

In a third embodiment, the present invention relates to a pneumatic radial ply tire having a tread, a carcass with two sidewalls, two inextensible annular beads, a radial ply structure, a belt structure located between the tread and the radial ply structure, and an air impermeable innerliner. The tire has a crown stiffening underlay structure disposed radially inward of and adjacent the radial ply structure and radially outward of and adjacent the innerliner. The underlay structure is comprised of a single flat strip of material disposed in a plurality of spaced apart, circumferential windings about the tire carcass. The flat strip is comprised of a plurality of high modulus essentially inextensible cords embedded more or less parallel to one another within an elastomeric matrix. The high modulus essentially inextensible cords are made of a material selected from a group of materials exemplified by nylon, rayon, polyester, arimid, metal and glass. The overall lateral width of the underlay structure is less than the lateral width of the breaker structure. The plurality of essentially inextensible cords embedded within the elastomeric material of the underlay structure may or may not be cut at regular intervals of between about 10 cm and 20 cm in order to enable the underlay strip to accommodate the blown up of the green tire carcass into the toroidal carcass shape. The cords are cut if the blow up change in diameter of the underlay strip is greater than the limited extensibility of the cord.

In another embodiment, the present invention relates to a pneumatic radial ply tire having a tread, a carcass with two sidewalls, two inextensible annular beads, a radial ply structure, a belt structure located between the tread and the radial ply structure, and an air impermeable innerliner. The tire has a crown stiffening underlay structure disposed radially inward of and adjacent the radial ply structure and radially outward of and adjacent the innerliner. The underlay structure includes a single flat strip of material disposed in a plurality of spaced apart circumferential windings about the tire carcass. The flat strip includes a plurality of high modulus essentially inextensible cords embedded more or less parallel to one another within an elastomeric matrix and a beam made of elastomeric material that is contiguous with the elastomeric matrix in which the high modulus essentially inextensible cords are embedded. The high modulus essentially inextensible cords are made of a material selected from a group of materials exemplified by nylon, rayon, polyester, aramid, glass and metal. The overall lateral width of the underlay structure is less than the lateral width of the breaker structure, and the plurality of essentially inextensible cords embedded within the elastomeric material of the underlay structure may or may not be cut at regular intervals of between about 10 cm and 20 cm, most preferably at about 15 cm intervals in order to enable the underlay strip to accommodate the blown up of the green tire carcass into the toroidal carcass shape. The cords are cut if the blow up change in diameter of the underlay strip is greater than the limited extensibility of the cord. The beam is made of elastomeric material having a modulus of elasticity that is equal to or greater than the modulus of elasticity of the elastomeric material within which the essentially inextensible cords are embedded, and it has a thickness of between about 1 millimeter and 10 mm and most preferably a thickness of between about 3 mm and 7 mm. The beam portion of the underlay structure might be positioned radially inward of the main body of the underlay structure, or radially outward of the main body of the underlay structure.

BRIEF DESCRIPTION OF THE DRAWINGS

The structure, operation, and advantages of the invention will become further apparent upon consideration of the following description taken in conjunction with the accompanying drawings, wherein:

FIG. 2A is a cross-sectional view of an EMT incorporating the present invention;

FIG. 2B is a cross-sectional detail view of the underlay according to the present invention;

FIG. 3A is a schematic diagram of a deformed tire tread in the region of the tire's footprint;

FIG. 3B is a schematic diagram showing the stresses in the upward-bending portion of the tire's footprint;

FIG. 3C is a schematic diagram showing the stresses in the downward-bending portion of the tire's footprint;

FIG. 7A is a cross-sectional view of the underlay with beam according to the present invention disposed between the innerliner and the radially inwardmost radial ply layer, with the beam element located radially inward of the cord reinforced flat strip;

FIG. 7B is a cross-sectional view of the underlay with beam according to the present invention disposed between the innerliner and the radially inwardmost radial ply layer, with the beam element located radially outward of the cord reinforced flat strip; and FIG. 7C is a schematic diagram showing the tensile and compressive stresses of a bend tire crown, and showing the position of the underlay invention in relation to the neutral bending axis of the tire crown.

DEFINITIONS

Figure 1:
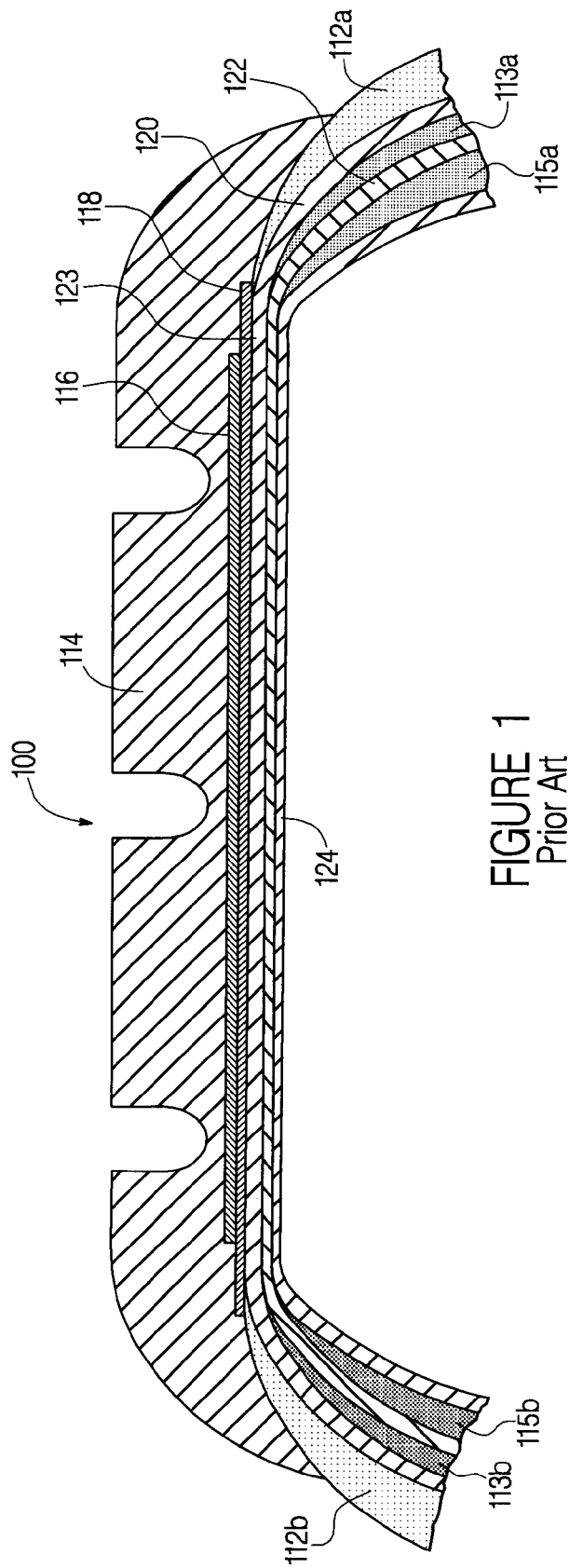
FIG. 1 is a cross-sectional view of a prior art EMT design incorporating reinforced sidewalls.

"Axial" and "axially" means the lines or directions that are parallel to the axis of rotation of the tire.

"Bead" or "bead core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" means at least two annular layers or plies of parallel cords, woven or unwoven, underlying the tread, unanchored to the bead, and having both left and right cord angles in the range from 17° to 27° relative to the equatorial plane of the tire.

"Breakers" or "tire breakers" means the same as belt or belt structure or reinforcement belts.

"Carcass" means the tire structure apart from the belt structure, tread, undertread, over the plies, but including the beads.

"Circumferential" refers to circular lines or directions extending along the perimeter of the surface of the tread parallel to the equatorial direction.

"Cord" refers to essentially inextensible high modulus fibers made of single wires or fibers or twisted multiple strands of fibers or wires.

"Equatorial plane" means the plane perpendicular to the tire's axis of rotation and passing through the center of its tread; or the plane containing the circumferential centerline of the tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Lateral" means a direction parallel to the axial direction, as in across the width of the tread or crown region.

"Normal Inflation Pressure" means the specific design inflation pressure and load assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90° with respect to the equatorial plane of the tire.

"Radial ply tire" means a belted or circumferentially-restricted pneumatic tire in which at least one ply has cords which extend from bead to bead are laid at cord angles between 65° and 90° with respect to the equatorial plane of the tire.

"Sidewall" means that portion of a tire between the tread and the bead.

"Tire crown" means the tread, tread shoulders and adjacent portions of the sidewalls.

"Wedge Insert" means the crescent- or wedge-shaped reinforcement typically used to reinforce the sidewalls of runflat-type tires.

DETAILED DESCRIPTION OF THE PREFERRED EMBODIMENT

While the main design goals of a crown reinforcement being those of resisting tread liftoff during low-pressure and no-pressure operation, in both EMTs and non-EMTs, subsidiary goals are simultaneously to improve vehicle handling and tire durability in normal fully pressurized operation.

Given those considerations, the present invention relates to a crown-reinforcing or crown-stiffening underlay structure that is light in weight and includes multiple, spaced apart flat, spiral band windings of a cord reinforced, elastomeric strip disposed between the ply layers of the carcass and the breaker package beneath the tread or, alternatively, between the innerliner and the radially inwardmost radial ply layer.

In a general sense, there are two basic parts of pneumatic radial ply tires used on cars and trucks. One part is the carcass, including the plies, two inextensible annular beads, sidewalls, the innerliner, and the elastomeric material, i.e., rubber, which holds those components together after the tire is assembled and the rubber is cured. The other part is the crown, which includes the tread and the underlying belts or breakers, also held together by a matrix of cured rubber. The division of the tire into two such parts reflects the manufacturing sequence wherein the crown or tread portion is assembled separately from the carcass, the latter being assembled on a cylindrical building drum before being "blownup" into and joined with the tread/breaker assembly before being cured under pressure in a heated press that, as well as curing the rubber, impresses the tread pattern into the radially outermost rubber and also informs the sidewalls with shape, texture and other patterns.

In such a generalized or generic tire, the belts or breakers, which are most often made of steel or other essentially inextensible material, are part of the crown assembly and are disposed immediately adjacent to, though radially outward of, the ply layers of the carcass.

An embodiment of the present invention contemplates the installation of multiple windings of flat strips of cord-reinforced elastomer, comprising an underlay structure, disposed in the location that is radially inward of the breakers in the crown region and radially outward of the ply layers of the carcass. An alternative embodiment also contemplates locating the crown reinforcement of the present invention in the region that is radially inward of the ply layers and radially outward of the innerliner. Yet another embodiment, contemplates the addition of an elastomeric "beam" which adds further to the rigidity of the aforementioned cord reinforced flat strip.

The Basic Invention

Referring now to FIG. 1, there is shown in cross sectional view a segment of a typical, prior art runflat or EMT radial ply tire 100 having a tread 114 underlaid by a radially outermost breaker 116 and an inner breaker 118, an outer radial ply layer 120, an inner radial ply layer 122, together comprising a radial ply structure 123, and an innerliner 124. The tire 100 also has sidewalls 112a, and 112b and two outer sidewall wedge inserts 113a, and 113b and two inner sidewall wedge inserts 115a and 115b. Though FIG. 1 shows an EMT design, it is also within the scope of the present invention to incorporate the is intended for its use in EMT as well as non-EMT designs.

FIG. 2A shows in cross sectional view a segment of a runflat or EMT radial ply tire 200, incorporating an aspect of the present invention, having a tread 224 underlaid by a radially outermost breaker 226 and an inner breaker 228, together comprising a breaker assembly 227. Also shown are an outer radial ply layer 230, an inner radial ply layer 232, an innerliner 234 and sidewalls 233a and 233b reinforced by an outer sidewall wedge insert 235a and 235b, respectively, and an inner sidewall wedge insert 237a and 237b, respectively. Also shown is an underlay structure 238 which is shown in the present embodiment as including six circumferential helical windings of underlay strip 240. That is to say, the underlay structure 238 is a single spaced apart helical winding of a flat strip 240 of material disposed circumferentially around the tire's carcass in the region radially outward of the carcass plies 230,232 and radially inward of the breakers 226,228. The overall lateral width "TW" of the windings of the underlay strip 240 of the underlay structure 238 is less than the width "bw" of the breaker structure 227.

FIG. 2B is a close-up cross sectional view of one winding of strip 240 of the crown stiffening underlay structure 238 (shown in FIG. 1A), according to the present invention. The components of the underlay strip 240 are a plurality of high modulus, essentially inextensible cords 242 embedded in an elastomeric matrix 244. The underlay strip 240 has a width "W" of about 6 mm to 20 mm and preferably about 10 mm. The underlay strip 240 has a thickness "t" of several millimeters. The cords 242 are multi-stranded or single wires or fibers made of materials from the class of high modulus materials that includes but not limited to rayon, nylon, polyester, metal, aramid and glass. That is to say, the underlay structure 238 is comprised of a single flat strip 240 of material disposed in a plurality of spaced apart, circumferential windings about the tire carcass. The flat strip 240 is comprised of a plurality of high modulus essentially inextensible cords 242 embedded more or less parallel to one another within the elastomeric matrix 244.

Principle of Operation

As stated hereinabove, the design goal of the present invention is to stiffen the crown and inhibit tread liftoff when a tire, EMT or non-EMT, is operated at an internal pneumatic pressure that is less than the design pressure.

Referring to FIG. 3A, there is shown schematically, a portion of the tread outer circumference 300 of a tire 302 riding upon a road surface 304. The view is parallel to the tire's axis, i.e., the view is from the side showing more or less the equatorial or central plane of the tire 302 in the region where the tread lift will be maximum. The tire 302 is shown with its footprint deformed due to being filled with less than optimal internal pressure such that the footprint region 306 of the tread 300 is deformed upward in the central region most immediately adjacent the tire's equatorial plane.

The upward buckled portion 308 of the tread 300, in the region demarcated by the letters "A" and "A" is shown in detail in FIG. 3B which is a schematic view of the layers extending radially inward from the tread 300 to the innerliner 310. The neutral bending axis 312 demarcates the separation of the tensile-stressed region 314 from the compression-stressed region 316. The letters "C" and "T" denote, respectively, compression and tension stresses in the tire components. Since the cords 318 (compare 242) contained within the tread stiffening underlay of the present invention lie on the tensile stress side 314 of the neutral axis 312, they contribute tensile stresses that add rigidity and resist bending deformation of the tread 300. In FIG. 3B the distance "d" separates the neutral bending axis from the reinforcing cord 318; that separation distance "d" corresponds to being a kind of moment arm through which the tensile forces acting on the cord 318 work to resist bending of the tire's tread and crown region.

Regarding the two upward bending regions 320 of the tread 300 shown in FIG. 3A, the detail view of FIG. 3C shows the corresponding tensile "T" and compressive "C" stresses in relation to the neutral bending axis 312, above which lie the cords 318 of the underlay of the present invention. In this instance, the cords 318 are in compression but, being of a high modulus material having the lateral support by an elastomeric matrix 244 (shown in FIG. 2B), the cords 318 are supported against the particular kind of compressive failure known as column failure of the sort encountered when long and thin structural members are subjected to compressive loading along their lengths. The result is that the reinforcing cords 318 contribute compressive force to resist the flexure of the crown and tread, thereby stiffening it against tread liftoff. Notice that, as in the tensile case illustrated in FIG. 3B, FIG. 3C shows the same distance "d" separating the neutral bending axis from the reinforcing cord 318 and, as in the tensile case above, the separation distance "d" corresponds to an effective moment arm distance through which the compressive forces acting on the cords 318 work to resist bending of the tire's tread and crown region.

In both the FIGS. 3B and 3C, which show, respectively, downward and upward bending modes, the presence of the cords 318 contributes to an increase in the bending modulus of the overall structure of the tread region 300, i.e., making the crown stiffer.

Installation of the Underlay

Figure 4B:
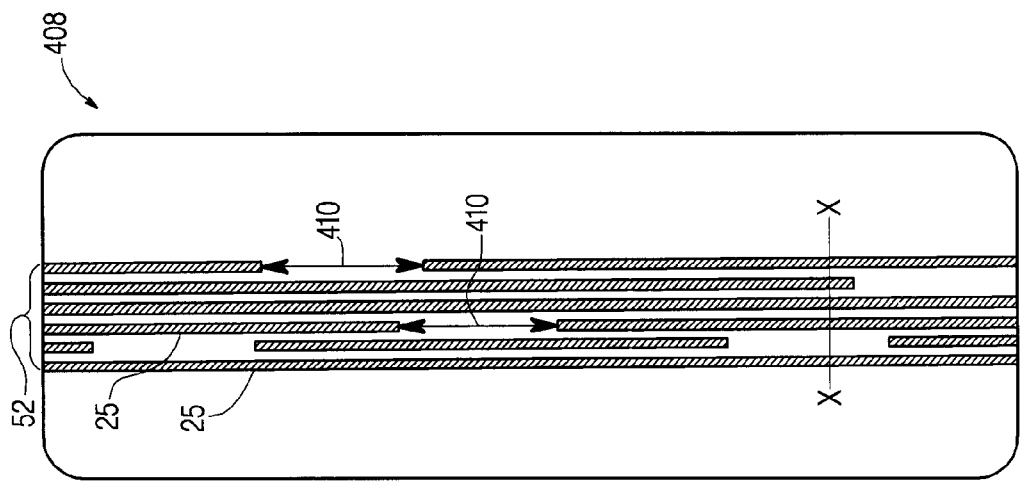
FIG. 4B is a schematic view showing the shape of the underlay according to the present invention after the green tire has been blown up into the tread assembly where the cords have been cut.
Figure 4A:
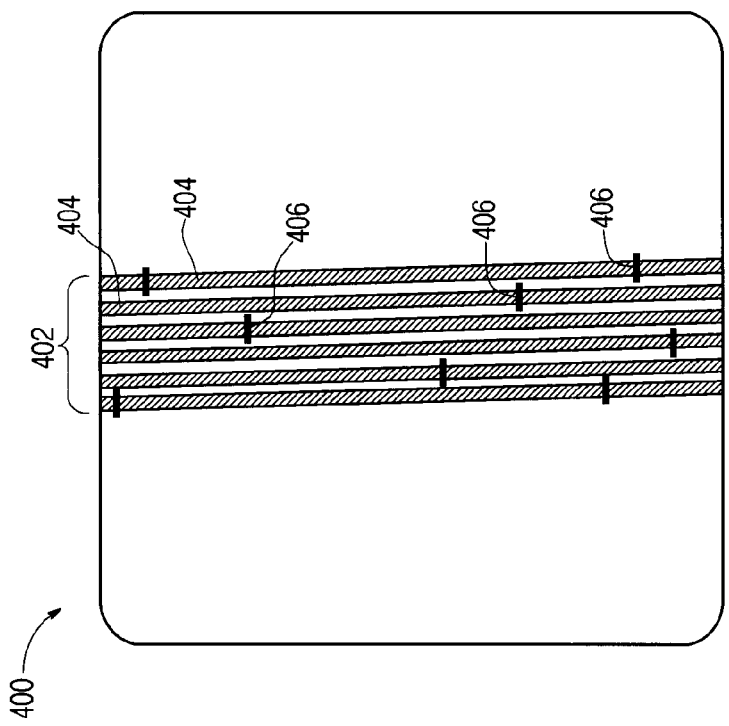
FIG. 4A is a schematic view of the underlay according to the present invention as applied to an green tire on the building drum where the cords have been cut.

Referring to FIG. 4A, a still to be blown up, green tire carcass 400 is shown as it would appear on a building drum (not shown). The underlay 402 is comprised on multiple spiral windings 404 (compare 240 of the underlay type shown in cross section in FIG. 2B). The number of spiral windings 404 is in the range of between four and thirty dependent upon the tread band width, most preferably sufficient to cover the central two thirds of the tread band width. Small cuts or separations in the windings 404 at regularly spaced locations 406 may or may not be present. While not limited, the cuts are preferably spaced, for example, about 10 to 20 centimeter intervals apart, in the high-modulus cords (compare 242 of FIG. 2B). The cuts or separations at the spaced locations 406, as shown on the green tire carcass 400, enable the underlay strip to accommodate the blow up of the green tire carcass into the toroidal carcass shape 408 as shown in FIG. 4B; the high-modulus cords within the individual windings 404 of the underlay 402 thus accommodate the blowup process. Cuts are not necessary if the amount of blowup does not exceed the limit of extensibility of the cords. The spacing of the cuts 406 in the unblown up tire 400 is such as to allow the formation of irregularly spaced separations 410 such that the separations do not overlap laterally across all parts of the windings 404 in any arbitrary, laterally oriented, line such as that denoted by the letters "X—X". This spacing thereby preserves the underlay's tread stiffening properties more or less uniformly around the circumference of the blown up tire carcass 408.

Figure 4C:
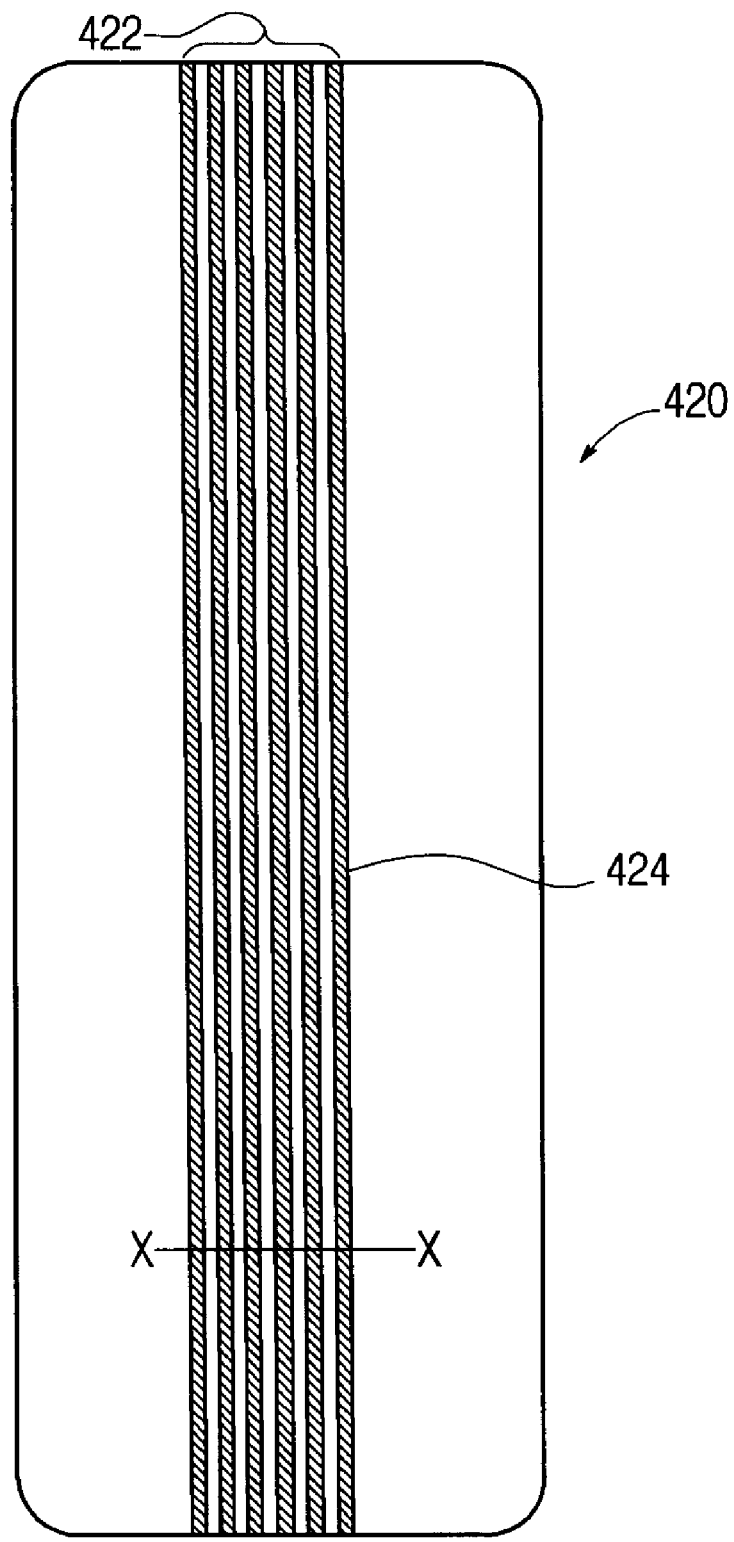
FIG. 4C is a schematic view showing the shape of the underlay according to the present invention after the green tire has been blown up into the tread assembly where the cords have not been cut.

Referring to FIG. 4C, a blown up, green tire carcass 420 is shown. The underlay 422 is comprised on multiple spiral windings 424 (compare 240 of the underlay type shown in cross section in FIG. 2B). The number of spiral windings 424 is in the range of between four and thirty dependent upon the tread band width, most preferably sufficient to cover the central two thirds of the tread band width. The underlay strip 422 is sufficiently elastic to accommodate the blow up of the green tire carcass 420 into the toroidal carcass shape as shown in FIG. 4C; the high-modulus cords within the individual windings 424 of the underlay 422 thus accommodate the blowup process. Cuts, as shown in FIGS. 4A and 4B are not necessary since the amount of blowup does not exceed the limit of extensibility of the cords.

SECOND EMBODIMENT

Figure 5:
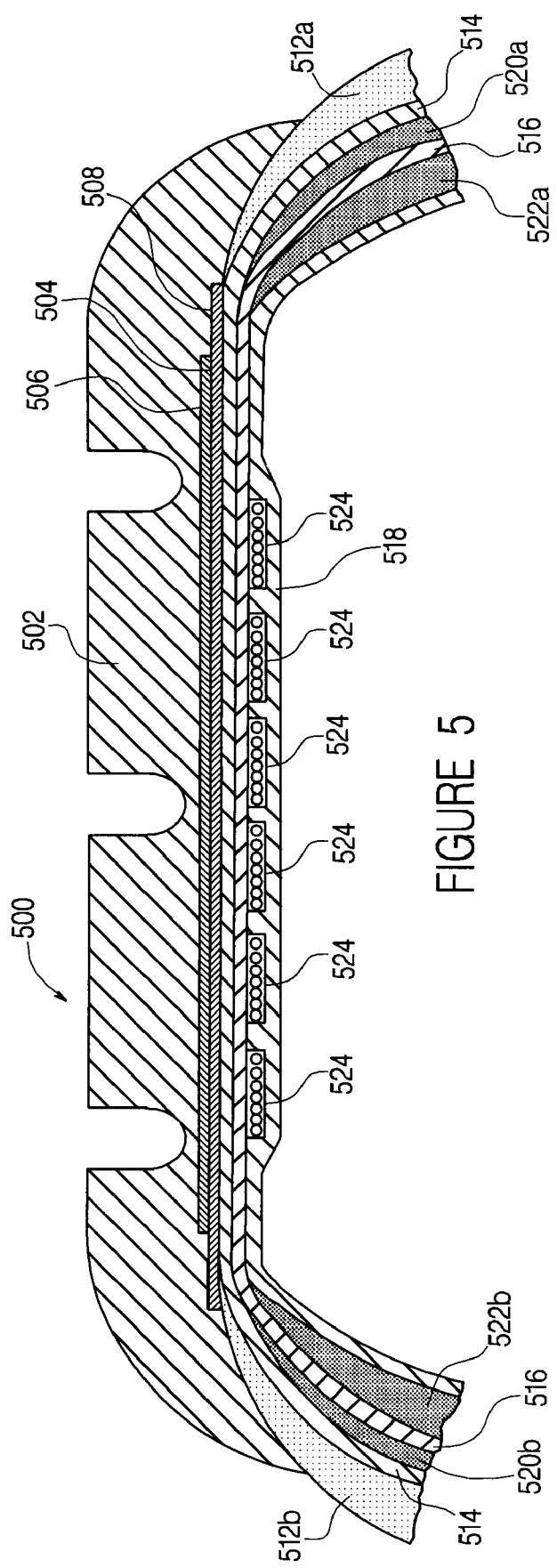
FIG. 5 is a cross-sectional view of the underlay according to the present invention disposed between the innerliner and the radially inwardmost radial ply layer.

A second embodiment of the present invention is characterized by its location, namely radially farther inward from the aforementioned location between a breaker package 504 and the radial ply layers of a tire 500. More specifically, the crown stiffening, cord reinforced flat strips of elastomeric tread underlay material, as described above, are disposed radially inward of the innermost radial ply layer and radially outward of the innerliner. FIG. 5 illustrates the second embodiment location in a tire 500 having a tread 502, a breaker package 504 comprised of a radially outer breaker 506 and a radially inner breaker 508. The tire 500 has a breaker package 504, sidewalls 512a,512b, an outer ply layer 514, an inner ply layer 516 and an innerliner 518. The tire segment shown in FIG. 5 is of the EMT design, but the inventors intend that the present invention find utility within non-EMT designs as well in substantially the same form shown, but without the sidewall inserts 520a,520b and 522a,522b, respectively, as shown in connection with this EMT illustrative example. The windings 524 (compare 240 of the underlay of the present invention are shown in FIG. 5) situated between the innerliner 518 and the radially innermost ply layer 516.

A benefit of this radially inward location, as shown in FIG. 5 relative to the first embodiment location, is the greater mechanical advantage of the underlay in stiffening the crown region and tread. The mechanical advantage becomes evident upon contemplation of FIGS. 3B and 3C wherein the distance "d" between the neutral bending axis and the cords 318 that are embedded in the underlay strip increases, which means that the moment arm distance, i.e., "d", between the cord and the neutral bending axis is increased in this second embodiment of the subject invention; this increase in separation distance "d" between the neutral axis and the reinforcing cord 318 (FIGS. 3B,3C) becomes greater by an amount roughly equal to the thickness of the ply layers 514,516, thereby giving an increased effective moment arm distance "d" in contributing to the overall bending moment of inertia of the crown and tread region of a tire incorporating this invention.

THIRD EMBODIMENT

Figure 6:
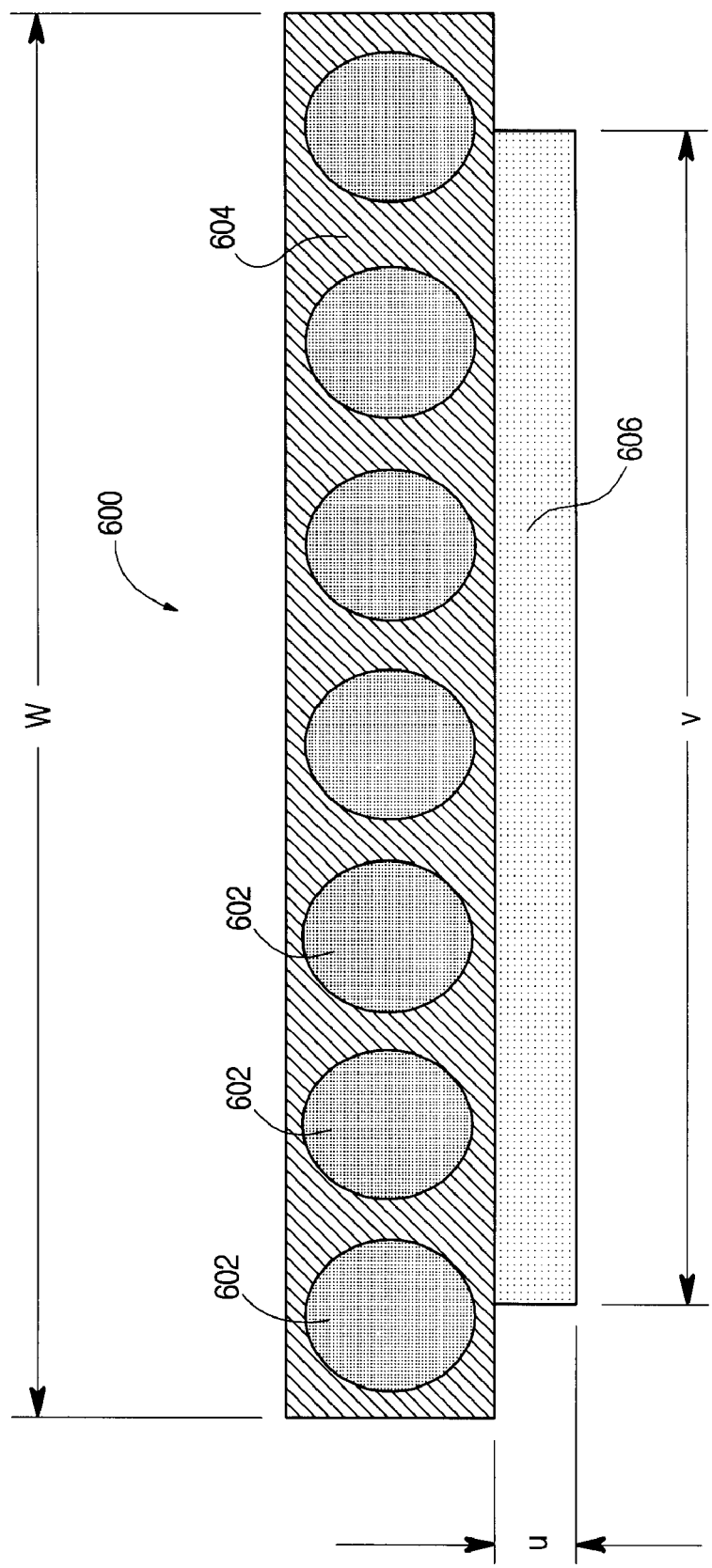
FIG. 6 is a schematic view of the basic underlay invention with an additional rubber "beam" element; this figure needs to be modified to show the beam under more than one strip

FIG. 6 illustrates, in cross sectional view, an embodiment of the present invention in which the cord reinforced flat strip 600, which is comprised of a plurality of reinforcing cords 602 (compare 242) embedded within an elastomeric matrix 604 (compare 244) and an additional rubber cushion 606 called a "beam", herein, that is contiguous with the other components of the flat strip portion of the invention as described hereinabove. Note that the beam 606 is disposed under each turn of the flat strip 600. The beam 606 has a thickness "u" and a width "v", the latter being less than the width "w" of the cord reinforced flat strip 600. The beam 606 has a thickness "u" of between about 1 millimeter and 10 millimeters and most preferably a thickness of between about 3 mm and 7 mm. The beam 606 is made of elastomeric material having a post-cure modulus of elasticity that is equal to or greater than the modulus of elasticity of the matrix 604 within which the cords 602 are embedded.

The beam 606 has the advantage of contributing to the tread and crown stiffening properties of the present underlay invention by two methods: (1) because of the intrinsic rigidity of the beam 606, and (2) because of the thickness "u" of the beam in displacing compressive and tensile stress load-bearing portion of the main body of the strip, i.e., the elastomeric matrix 604 containing the reinforcing cords 602, radially farther outward from the neutral bending axis of the crown/tread region of the tire, increases yet further the displacement of the underlay, specifically its high-modulus cord components, from the neutral bending axis which thereby contributes yet further to an increase in the bending moment of inertia of the crown/tread region of the tire.

Beam Beneath the Underlay

FIGS. 7A and 7B show in cross sectional view two tires 700 and 702 which are substantially the same except for the orientation of the underlays 704 and 706, respectively, according to the present invention. Specifically, the underlays 704 and 706 have their respective beams 708 and 710 disposed at different orientations in the respective FIGS. 7A and 7B. Each of the tires 700 and 702 generally have identical constructions (and therefore the use of similar designation numbers between FIGS. 7A and 7B refers to substantially the same components) except for the underlays 704 and 706 as previously discussed and as described in more detail hereinafter. The tires 700 and 702 each have a tread 712 and a breaker structure 714 comprised of two breakers 715,716, sidewalls 718a,718b, a radially outer radial ply 720, a radially inner radial ply 722, and an innerliner 724. In FIG. 7A, the windings of the six windings of the underlay 704 with beam 708 are oriented such that the beam portion 708 (compare 606 in FIG. 6) is radially inward of the cord reinforced elastomeric portion of the underlay 600 shown in FIG. 6.

In FIG. 7B, the six windings of the underlay 706 with beam portion 710 (compare 606 in FIG. 6) are oriented in such as way that the beam portion lies radially outward of the cord reinforced elastomer portion of the underlay structure 706.

FIG. 7C is a schematic view side view (i.e., a view parallel to the axis of rotation of the tires 700 and 702) of and upward (or radially inward) bent portion of the tread and crown region 730 of the tires 700 and 702, as would be found in the upward buckled portion of the tread footprint when the tire is operated at an internal pressure that is less than optimal to maintain a most desired footprint. The outer portion of the tire 700, i.e., the tread region 732, and the inner portion of the tire, i.e., innerliner region 734, constitute a structure that is bent in such as way as to put the radially inward innerliner side 734 into tension T while the radially outward tread region side 732 experiences compression forces C. The two regions of tension T and compression C are separated by the neutral bending axis 736. In the view shown in FIG. 7C, the underlay 738 (representing either respective underlays 704 and 706 in FIGS. 7A and 7B) is shown separated from the neutral bending axis 736 by a variable distance "vd", which is called variable because it can be varied for specific tire designs requiring greater or lesser amounts of crown stiffening. For example, in FIG. 7A where the beam portion 708 is disposed radially inward of the main body of the cord reinforced elastomeric portion of the underlay 704, the addition of the beam will cause the distance "vd" to be greater than if the beam were not present, i.e., without the beam, the tire would be as described above in reference to FIGS. 3B and 3C. But with the addition of the beam portion 708, the distance "vd" can be increased according to the thickness "u" (see FIG. 6) of the beam portion and/or in relation to the elastic modulus of the rubber compound of which the beam portion is formulated. The greater the distance "vd", the greater will be the bending moment of inertia of the crown region of the tire, for the reasons described hereinabove. Alternatively, the underlay with beam can be installed such that the beam portion lies radially outward of the cord reinforced elastomeric portion, as shown in FIG. 7B, in which case, the essentially inextensible cords (compare 602 in FIG. 6) will be displaced farther from the neutral bending axis 736 by the thickness "u" of the beam 710, thereby increasing the variable distance "vd", and thus also contributing an increase to the bending moment of inertia of the tire crown over and above that illustrated in reference to FIGS. 3A through 3C.

Finally, the inventors further envision the deployment of the herein described underlay with beam in the region that is radially inward of the ply layers and radially outward of the innerliner (not shown), thereby achieving yet greater increases in crown stiffness, as needed in various EMT and non-EMT tire designs. In such a location, the beam portion of the underlay might be, as designs needs require, radially inward or radially outward of the main cord-reinforced flat strip portion of this underlay invention.

Road Tests

Tests of the underlay invention show that vehicle steering is improved when running straight, and is not degraded in turns. Furthermore, on relatively soft tar macadam roads (which often tend to develop track 'grooves' associated with heavy truck traffic), a car with these tires that are equipped with the present invention have been shown to be less likely to be affected by the grooves, thereby yielding improved tracking.

Although the invention has been illustrated and described in detail in the drawings and foregoing description, the same is to be considered as illustrative and not restrictive in character it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed:

1. A pneumatic radial ply tire having a tread, a carcass with two sidewalls, two inextensible annular beads, a radial ply structure, a belt structure located between the tread and the radial ply structure, and an air impermeable innerliner, said tire being characterized by:
    a crown stiffening underlay structure disposed radially inward of and adjacent the belt structure and radially outward of and adjacent the radial ply structure, the underlay structure being comprised of a single flat strip of material disposed in a plurality of spaced apart circumferential windings about the tire carcass, the flat strip being comprised of:
        a plurality of high modulus essentially inextensible cords embedded more or less parallel to one another within an elastomeric matrix.

2. The tire of claim 1 in which the high modulus essentially inextensible cords are made of a material selected from a group of materials consisting of nylon, rayon, polyester, aramid, metal and glass.

3. The tire of claim 1 in which the overall lateral width of the underlay structure is less than the lateral width of the breaker structure.

4. The tire of claim 1 in which the plurality of essentially inextensible cords embedded within the elastomeric matrix of the underlay structure are cut at regular intervals of between about 10 cm and 20 cm, most preferably at about 15 cm intervals to enable the underlay strip to increase in length to accommodate the increase in circumference as the green tire carcass is blown up into a toroidal carcass shape.

5. A pneumatic radial ply tire having a tread, a carcass with two sidewalls, two inextensible annular beads, a radial ply structure, a belt structure located between the tread and the radial ply structure, and an air impermeable innerliner, said tire characterized by:
    a crown stiffening underlay structure disposed radially inward of and adjacent the belt structure and radially outward of and adjacent the radial ply structure, the underlay structure being comprised of a single flat strip of material disposed in a plurality of spaced apart circumferential windings about the tire carcass, the flat strip being comprised of:
        a plurality of high modulus essentially inextensible cords embedded more or less parallel to one another within an elastomeric matrix; and
        a beam made of elastomeric material that is contiguous with the elastomeric matrix in which the high modulus essentially inextensible cords are embedded.

6. The tire of claim 5 in which the high modulus essentially inextensible cords are made of a material selected from a group of materials consisting of nylon, rayon, polyester, aramid, glass and metal.

7. The tire of claim 5 in which the overall lateral width of the underlay structure is less than the lateral width of the breaker structure.

8. The tire of claim 5 in which the plurality of essentially inextensible cords embedded within the elastomeric material of the underlay structure are cut at regular intervals of between about 10 cm and 20 cm, most preferably at about 15 cm intervals in order to enable the underlay strip to accommodate the blown up of the green tire carcass into the toroidal carcass shape.

9. The tire of claim 5 in which the beam is made of elastomeric material having a modulus of elasticity that is equal to or greater than the modulus of elasticity of the elastomeric material within which the essentially inextensible cords are embedded.

10. The tire of claim 5 in which the beam has a thickness of between about 1 mm and mm and most preferably a thickness of between about 3 mm and 7 mm.

11. The tire of claim 5 in which the beam portion of the underlay structure is positioned radially inward of the main body of the underlay structure.

12. The tire of claim 5 in which the beam portion of the underlay structure is positioned radially outward of the main body of the underlay structure.

* * * * *